United States Patent [19]

Mann

[11] Patent Number: 5,379,726
[45] Date of Patent: Jan. 10, 1995

[54] HANDLED DOG COLLAR

[76] Inventor: Matthew J. Mann, 6 Hulse St., Middletown, N.Y. 10940

[21] Appl. No.: 73,579

[22] Filed: Jun. 7, 1993

[51] Int. Cl.6 .................................................. A01K 27/00
[52] U.S. Cl. ..................... 119/793; 119/856
[58] Field of Search ............... 119/793, 856, 857, 858, 119/863, 792, 794, 770

[56] References Cited

U.S. PATENT DOCUMENTS

| D. 330,273 | 10/1992 | Cernek | 119/856 |
|---|---|---|---|
| 602,861 | 4/1898 | Lyon | 119/770 |
| 887,072 | 5/1908 | Delaney | 119/794 |
| 4,384,548 | 5/1983 | Cohn | 119/792 |
| 4,413,589 | 11/1983 | Bielen, Jr. | 119/792 |
| 4,491,090 | 1/1985 | Almeida | 119/856 |
| 4,530,309 | 7/1985 | Collins | 119/863 |
| 4,559,906 | 12/1985 | Smith | 119/863 |
| 4,655,172 | 4/1987 | King | 119/792 |
| 4,676,198 | 6/1987 | Murray | 119/856 |
| 4,811,695 | 3/1989 | Higgins | 119/863 |

FOREIGN PATENT DOCUMENTS

| 344181 | 11/1921 | Germany | 119/856 |
|---|---|---|---|
| 505826 | 5/1939 | United Kingdom | 119/858 |
| 2258380 | 2/1993 | United Kingdom | 119/792 |

Primary Examiner—Todd E. Manahan
Attorney, Agent, or Firm—Sandra M. Katin

[57] ABSTRACT

An animal collar, more specifically a dog collar for use with large and powerful dogs, has a rigid handle securely affixed to its center so that the handler maintains complete control over the dog at all times and there is excellent communication between dog and handler. The handle is angled such that the correct orientation is maintained whether the handler is on the right or left side of the dog. The collar also is fitted with rings to accomodate a standard leash. A curved steel reinforcing plate within the layers of the collar prevents the handle from coming dislodged. The collar is wide enough so as not to pinch or cut off the windpipe of the dog even under strain.

17 Claims, 3 Drawing Sheets

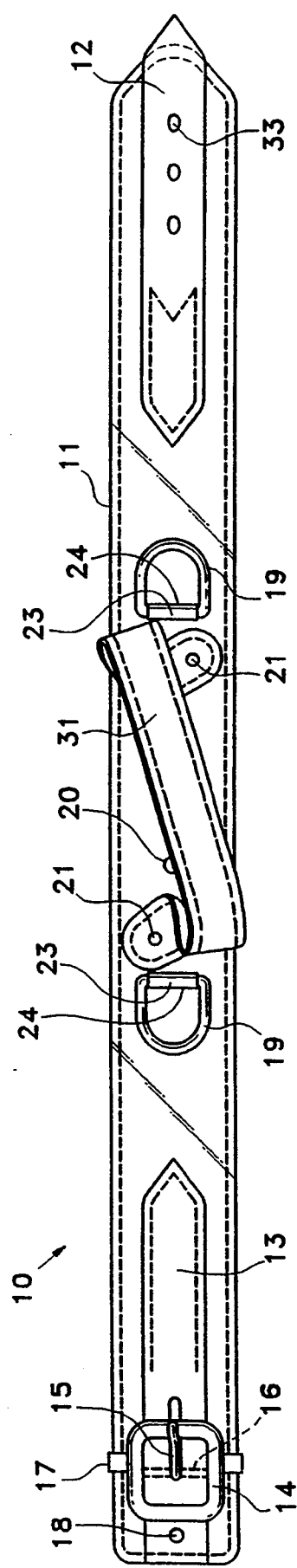
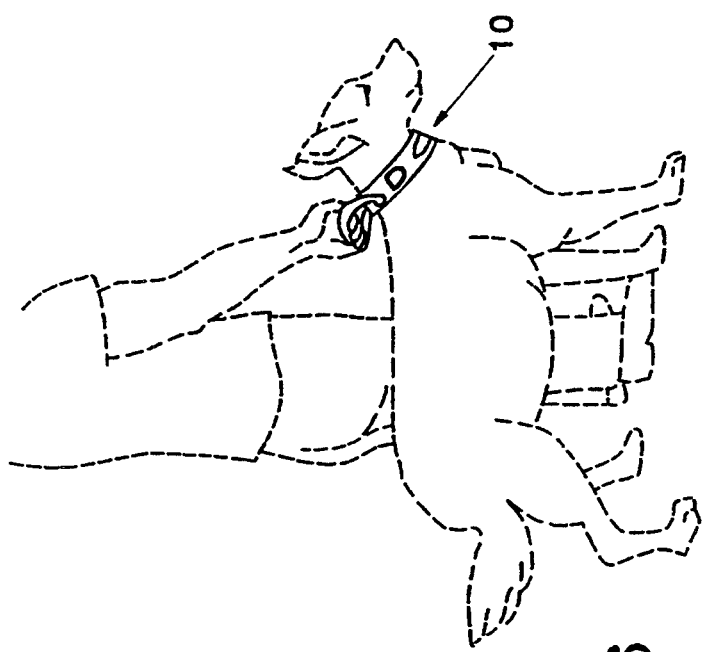
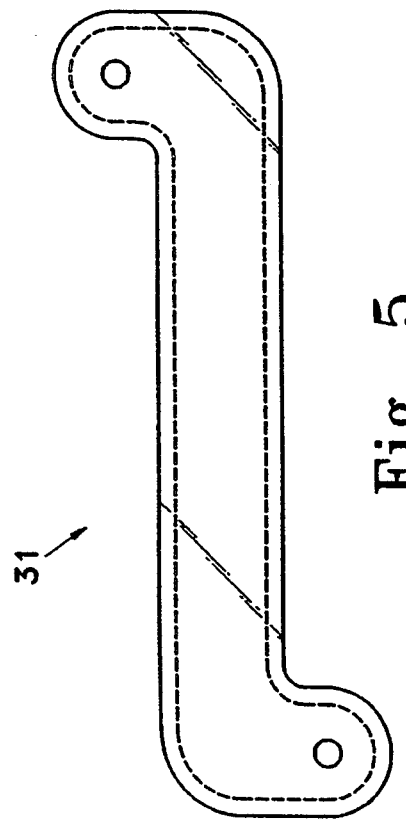
Fig. 1
Fig. 5
Fig. 6

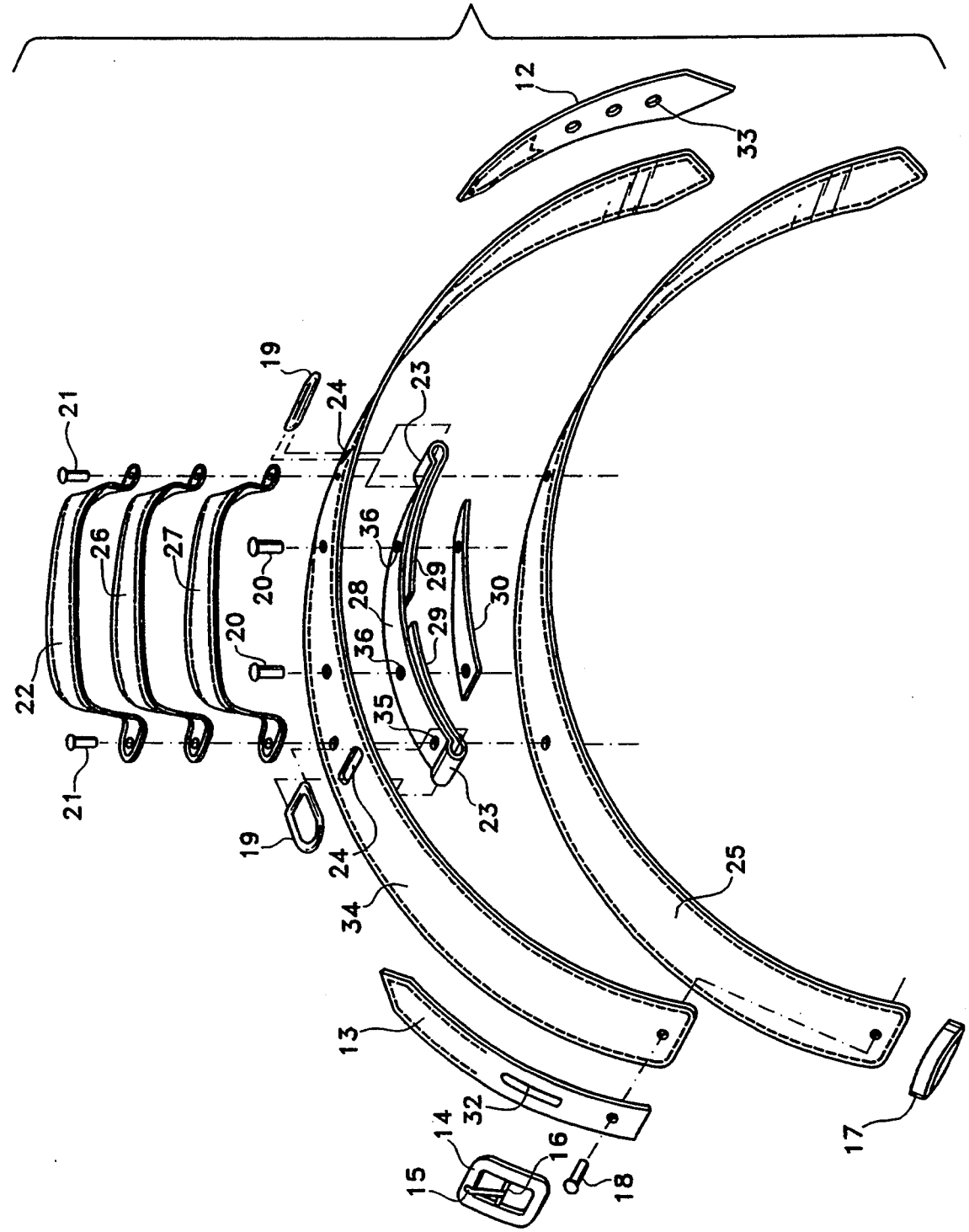

HANDLED DOG COLLAR

FIELD OF THE INVENTION

The instant invention relates to an animal collar and more specifically a dog collar for use with large dogs. The collar having permanently and securely affixed thereto a rigid handle so as to enable the handler to better control the movements of the animal without the slack normally found in a leash. The handle is angled so as to be equally effective for use by a right-handed or left-handed person.

BACKGROUND OF THE INVENTION

Collars have been used on animals since mankind has domesticated them and caused them to do his bidding. The collars have had affixed to them ropes or tethers to hold the animals in check. Such collars are still in use for dogs and other domesticated animals. They serve as a means to control the animals, to restrain them and as a site to which are affixed leashes, identification tags, health tags and license tags. For small dogs and other small animals, attaching a leash to a metal loop affixed to the collar is all that is necessary to control the movements of the animal. When a large dog is to be handled, the dog can lurch Forward, pulling the leash suddenly and causing the handler to loose his or her balance and often, with a very large dog, to lose control of the animal altogether.

To prevent this from happening short looped leashes made of wide strips of a strong material have been developed which are much better at preventing the handler to lose balance when the dog pulls, but still do not give the handler complete control of a large strong dog.

Leather harnesses of various types have also been used with ropes, tethers or leashes. For special purposes, harnesses have had handles attached so that the person working with the dog would be closer and have more control. Seeing eye dogs have worn harnesses with rigid handles so the dogs could guide their masters and function with them as a single unit. In such cases the rigid handle is attached to the harness at a point behind the shoulders of the dog such that the dog walks slightly ahead of the person it is guiding. This produces a slight time lag when the dog stops before the signal is transferred to the person being led. Ideally, the dog should walk at the person's side with the head close to the person's leg. This permits the best communication between the dog mad the person being guided.

Law enforcement officers using dogs as companions on patrol or to sniff out narcotics or explosives must have the tightest control over their canine partners. Again leashes, even short sturdy ones do not provide the best control. If a dog is to be pulled back from an attack or from a container it has located the handler needs instant and complete control.

Choke-chains are also used by some animal handlers and trainers, but are strongly eschewed by others as cruel and injurious. A choke-chain can cause the animal's windpipe to be closed off or permanently damaged when the animal pulls or lurches forward.

All of the collars and leashes currently on the market are basically the same, differing primarily in the material of which they are made, not their design.

The instant invention is a dog collar designed to be used with large and powerful dogs, which in no way will injure the dogs, but will give the handler a degree of control not heretofore found. Additionally, a conventional leash can also be used with the collar of the present invention.

BRIEF SUMMARY OF THE INVENTION

The present invention is a sturdy dog collar to which is affixed a rigid handle and which is wide enough so that when the dog pulls or lurches forward its windpipe will not be cut off or depressed.

It is an object of the present invention to provide a collar for large dogs such that the control point is at the side of the handler and near his or her leg for optimum control and communication between animal and handler.

It is a further object of the present invention that the handle be set at such an orientation that the angle of the handle is correct for best control whether the handler is right-handed and holds the dog at his or her right side or is left-handed and holds the dog at his or her left side. This is accomplished by the unique shape of the handle and the way that it lies when mounted on the collar.

It is another object of the present invention that there be two loops affixed to the collar, one on each end of the handle, such that a leash may be attached thereto for use by a right-handed or left-handed person. A longer rigid handle may also be used with the collar as for a seeing eye dog.

A still further object of the present invention is to have the collar fastened by a buckle system such that there is a large overlap of the collar material and the buckle and attaching strip are stitched to the material of the collar thus making for a much stronger hold and distributing the stresses along the material and not on one section of the material.

Another object of the present invention is to have the collar made of such durable and sturdy material that it is very long lasting and dependable. The handle is attached such that the strongest animal cannot cause it to be pulled loose.

The instant invention is designed to be used by dog trainers and handlers and also by law enforcement officers. It may be used with seeing eye dogs to afford a closer communication between the animal and person being guided than is now possible with the present harness system.

The collar of the instant invention may also be used in the handling of other animals of suitable size and stature.

BRIEF DESCRIPTION OF THE DRAWINGS

FIG. 1 is a top plan view of the present invention.

FIG. 2 is an exploded perspective view of the present invention showing all parts.

FIG. 5 is a top plan view of the unattached handle.

FIG. 6 is a perspective view showing the dog collar of the present invention in use.

DETAILED DESCRIPTION OF THE INVENTION

Figure 3:
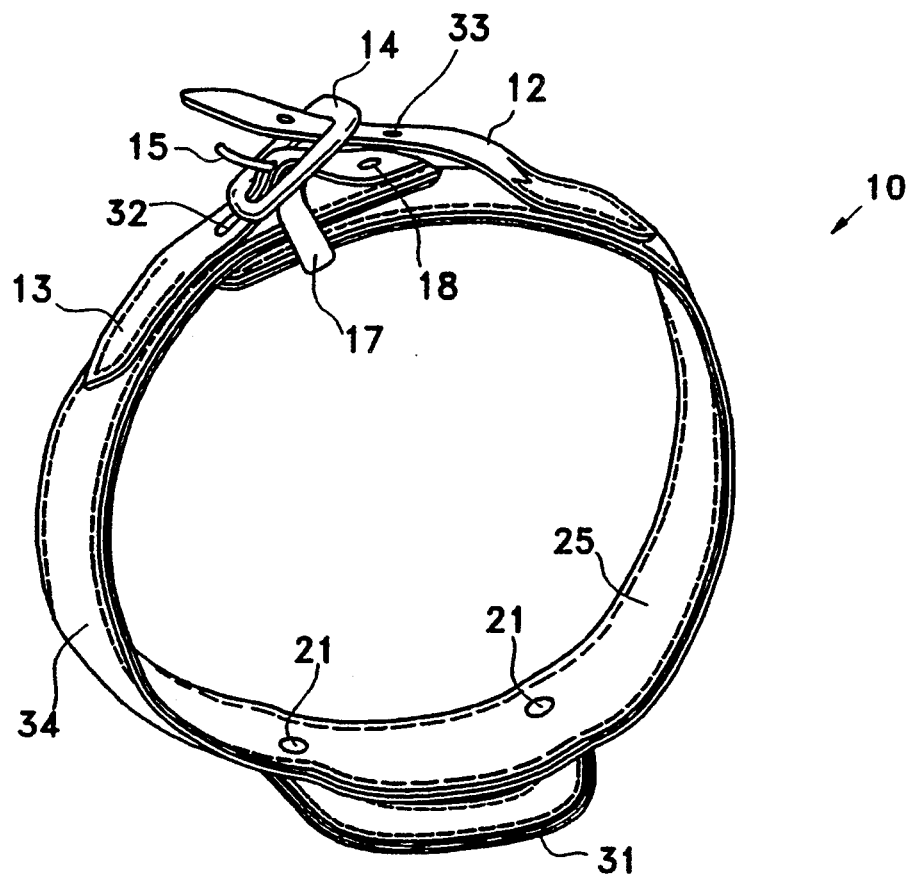
FIG. 3 is a side perspective view showing the closing means in communication.

The dog collar 10 of the present invention is designed to be used with large and powerful dogs, and can also be used with other animals of suitable size. This necessitates that the collar 10 be made of strong material to withstand a lot of stress and strain on the handle and closure and that the collar be durable. The preferred embodiment of the instant invention is made of layers heavy leather and is reinforced where noted. The leather components are stitched together and rivets are used to secure attachments. D-rings are provided so that the collar 10 may also be used with a leash. The handle is uniquely shaped and mounted such that it lies at the correct angle whether the handler positions himself or herself on the right or left side of the animal. See FIG. 6. There are two D-rings, one on either side of the handle, positioned so that when a leash is used it is in the correct position in relationship to the handle for right or left side orientation.

The basic collar is a strap 11 of sufficient length to encircle the neck of the dog with a degree of overlap. The strap is composed of an upper layer 34 and a lower layer 25 held together by stitching which goes completely around its perimeter. The strap 11 is of sufficient width such that it will not cause the dog's windpipe to be cut off or compressed when the dog pulls forward or strains against the collar. As can be seen in FIG. 1, one end of the strap is squarely cut and has the closing means 14 attached thereto, and the other end is tapered and has a fastening strip 12 attached which communicates with the closing means 14.

The preferred closing means is a buckle 14 containing a pin 15 that pivots along pin support 16. The buckle 14 is affixed to the upper layer 34 of the strap 11 by means of a holding strip 13 which is squarely cut at one end and tapering at the other. The squarely cut ends of the upper layer 34 and the holding strip 13 are aligned. The holding strip 13 is stitched to the upper layer 34 of the strap 11 along the squarely cut end and about the perimeter of the opposing one half and tapered end. A reinforcing rivet 18 is mounted at the squarely cut end of the strap 11 and passes through the holding strip 13, the upper layer 34 and lower layer 25 of the strap 11. A slot 32 located near the squarely cut end of holding strip 13 permits the buckle pin 15 to pass through. Fastening strip 12 is tapered at both ends, and contains a plurality of evenly spaced holes 33 near one end. One third of the opposing end is fixedly attached to the tapering end of strap 11 by being stitched to upper layer 34 with the stitching running about the perimeter of the one third and closing upon itself in a continuous line to distribute stress along the strip 12 and not at a single point. This can be seen in FIG. 1 and FIG. 3. Fastening strip 12 is positioned such that the end containing the holes 33 extends slightly beyond the end of strap 11.

The handle 31 is shaped like an elongated "S" as can be seen in FIG. 5, and it is composed of three layers as noted in FIG. 2. The upper layer 22 and lower layer 27 are of leather and the middle stiffening layer 26 is rawhide. The rawhide serves to maintain the shape and provides rigidity to the handle 31. The three layers are stitched together around the entire perimeter and function as a single unit. When the handle 31 is mounted on strap 11 it is twisted such that the handle 31 remains upright for easy access, and is angled. The angle of the handle 31 provides the correct orientation for the user whether the animal is on his or her right or left side.

A metal reinforcing plate 28 is located under the handle 31 and between the two layers 34 and 25 of the strap 11. (See FIG. 2) The plate is made of a strip of metal, preferably stainless steel that is turned under at two points such that the turned ends form another layer 29, but do not quite meet. The points where the metal is turned or folded are rounded thus forming housings 23.

There are four sets of holes in the plate 28, two sets 35 located near the housings 23 and the other two sets 36 located on either side of center, to accomodate rivets. A small strip of leather 30 is positioned beneath plate 28 and just above lower strap layer 25. D-rings 19 are slipped into each housing 23 and pass through slots 24 in the upper layer 34 of strap 11 which are located on either side of handle 31. The D-rings function to receive the communicator of a leash when such is used with the collar 10. Plate 28 is curved in the arc of a circle so that the collar 10 will be round when in use about the neck of the animal.

Figure 4:
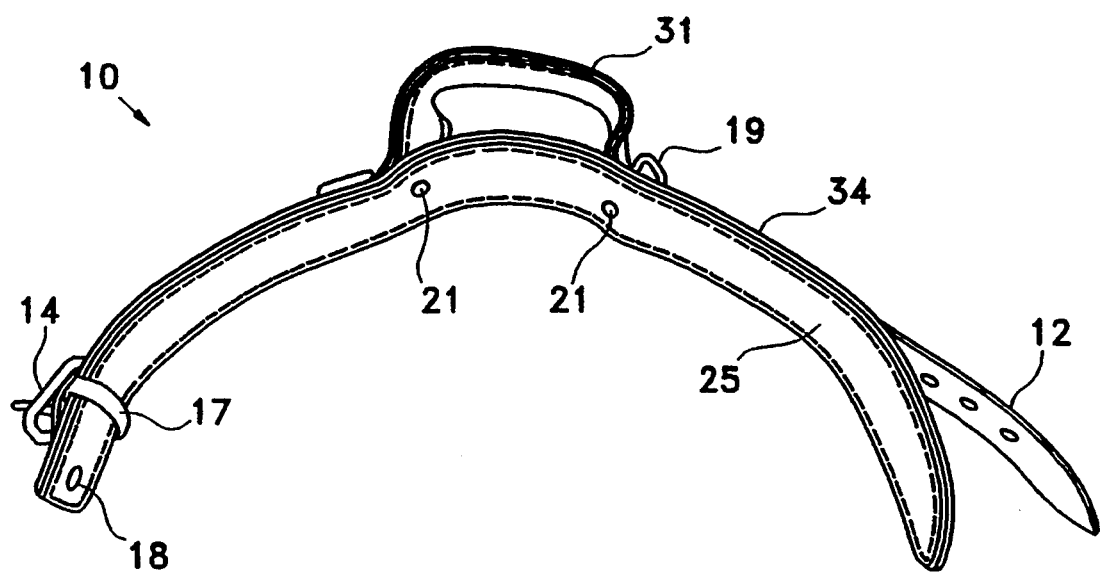
FIG. 4 is a perspective view showing the underside of the dog collar of the present invention.

As can be seen in FIG. 2 and FIG. 4, the handle 31 is mounted on top of strap 11 in the center thereof. It is held in place securely at each end by rivets 21. The rivets 21 pass through all layers of the handle 31, through upper layer 34 of strap 11, through holes 35 on the upper part of plate 28, through corresponding holes in the folded parts 29 of plate 28, and through the lower layer 25 of strap 11. Additional rivets 20 serve to anchor plate 28. These rivets 20 are located beneath handle 31 and adjacent to each of its anchored ends. Said rivets 20 pass through upper layer 34 of strap 11, through holes 36 on the upper surface of plate 28, through corresponding holes in folded parts 29, and through leather strip 30. The leather strip 30 functions as a cushion between the splayed ends of the rivets 20 and the folded parts 29 of metal plate 28. Rivets 20 do not pass through lower layer 25 of strap 11 and the ends of said rivets are thus concealed from view.

A leather retainer loop 17 encircles strap 11 and is located beneath buckle 14 and holding strip 13. It is held in place by holding strip 13. When the collar 10 is fastened about the neck of the animal, the tapered end and overlapping portion of strap 11 passes under the straight end and is received by retainer loop 17 and held in place. At that time fastening strip 12 engages the buckle 14 and buckle pin 15 passes through one of the holes 33 in the fastening strip 12. See FIG. 3.

The overlap of the ends of strap 11 and the use of fastening strip 12 to engage the buckle 14 serve to distribute the stress along the collar and not at a single point so as to provide a more durable product.

While one embodiment of the present invention has been illustrated and described in detail, it is to be understood that this invention is not limited to this precise embodiment mad that various changes or modifications may be effected without departing from the scope of the following claims.

I claim:

1. An animal collar comprising a strap of stiff but flexible material longer than the circumference of the neck of the animal and having a closure means at one end for coaction with the opposing end so as to secure said collar about the neck of the animal, and a handle fixedly attached to said strap at two points along its length to provide a means for the handler to have complete control over the animal, said handle being angled to function equally on the right or left side of the animal.

2. A dog collar comprising:
   a strap of stiff but flexible material longer than the circumference of the neck of the dog so as to overlap when in use, said strap having one end squarely cut and the opposing end tapered;
   a closing means securely affixed at the squarely cut end which can coact with the tapered end to secure the collar about the neck of the dog; a rigid handle angled to function equally on the right or left side of the animal securely affixed at its two ends to said strap at the center thereof to provide a means for the handler to have complete control over the dog; and a D-ring also securely affixed to the strap so as to provide a means for communication with a standard leash.

3. A dog collar comprising:

(a). a strap made up of two layers of stiff but flexible material, said layers being stitched together about the entire perimeter of the strap, one end of said strap being squarely cut and the opposing end being tapered, and the upper layer of the strap having two slots, each at a short distance from and at either side of the center, and said slots lying perpendicular to the length of the strap;

(b). a holding strip narrower than said strap, squarely cut at one end and tapered at the opposing end, affixed to said strap with squared ends aligned, and said holding strip having a slot along its length to accomodate a closing means;

(c). a fastening strip narrower than said strap, tapered at both ends, affixed to said strap at its tapered end and extending beyond said tapered end, the fastening strip having a plurality of evenly spaced holes along the center line of its extending portion to coact with the closing means;

(d). a rigid handle fixedly attached to said strap at the center thereof, said handle being affixed at its two ends;

(e). a metal reinforcing plate located beneath the said handle, extending beyond the ends of said handle, and lying between the two layers of the strap, said plate being convexedly curved so as to maintain the collar in a circle when in use about the neck of the dog, said plate being turned under at two points such that the two ends form a bottom layer of said plate but do not meet, and said turning points forming housings which pass through the slots located in the upper layer of the strap at both sides of the handle;

(f). two D-rings, one in each of said housings, to receive the communicator of a leash;

(g). a thin cushioning strip located beneath the reinforcing plate and between the layers of the strap; and (h). a retainer loop which encircles said strap and is located under the holding strip near the squarely cut end of the strap, said retainer loop serves to receive the overlapping tapered end of said strap when the collar is in use.

4. A dog collar as in claim 3 wherein the strap, fastening strip, holding strip, retainer loop and cushioning strip are made of leather.

5. A dog collar as in claim 3 wherein the handle is shaped like an elongated "S" such that when affixed to the collar it is angled to function equally on the right or left side of the animal.

6. A dog collar as in claim 5 wherein said handle comprises three layers, a top and bottom layer of leather, and a middle layer of rawhide to add rigidity to the handle.

7. A dog collar as in claim 6 wherein all layers of said handle are held together by stitching about its entire perimeter.

8. A dog collar as in claim 3 wherein the handle is affixed at each end by a rivet, said rivets passing through the ends of the handle, the upper layer of the strap, the two layers of the reinforcing plate, and the lower layer of the strap.

9. A dog collar as in claim 3 wherein two rivets are utilized to anchor the reinforcing plate, said rivets being situated beneath the handle adjacent to its points of attachment and passing through the upper layer of the strap, the two layers of the reinforcing plate and the cushioning strip.

10. A dog collar as in claim 3 wherein the reinforcing plate is made of stainless steel.

11. A dog collar as in claim 3 wherein the reinforcing plate contains four sets of holes, two sets located near the housings and the other two sets located on either side of center, said holes to accommodate rivets, and all of said holes passing through both layers of the reinforcing plate.

12. A dog collar as in claim 3 wherein the closing means is a buckle, the pin of which extends through the slot in said holding strip.

13. A dog collar as in claim 12 wherein the buckle is made of metal.

14. A dog collar as in claim 3 wherein the holding strip is affixed to the upper layer of the strap by stitching along the squarely cut end and about the perimeter of the tapered end.

15. A dog collar as in claim 3 wherein there is a reinforcing rivet located at the squarely cut end of the strap, said rivet passing through the holding strip and the two layers of the strap.

16. A dog collar as in claim 3 wherein the fastening strip is affixed to the strap by stitching running about the perimeter of its non-holed portion, and said stitching closing upon itself in a continuous line so as to distribute stress along the length of the strip and not at a single point.

17. A dog collar as in claim 3 wherein the D-rings are made of steel.

* * * * *